US007952784B2

(12) United States Patent
Steffen et al.

(10) Patent No.: US 7,952,784 B2
(45) Date of Patent: May 31, 2011

(54) METHOD AND DEVICE FOR EMITTING MIXED LIGHT COLORS

(75) Inventors: Eckhard Steffen, Burgthann (DE); Till Kiewning, Altdorf (DE)

(73) Assignee: Diehl Aerospace GmbH, Öberlinger (DE)

( * ) Notice: Subject to any disclaimer, the term of this patent is extended or adjusted under 35 U.S.C. 154(b) by 88 days.

(21) Appl. No.: 12/205,172

(22) Filed: Sep. 5, 2008

(65) Prior Publication Data

US 2009/0067168 A1 Mar. 12, 2009

(30) Foreign Application Priority Data

Sep. 7, 2007 (DE) ........................ 10 2007 042 768

(51) Int. Cl.
*G02B 26/00* (2006.01)

(52) U.S. Cl. ........ 359/238; 315/149; 315/154; 315/155; 359/239

(58) Field of Classification Search .................. 362/231, 362/149; 315/149, 291, 154; 359/238, 239
See application file for complete search history.

(56) References Cited

U.S. PATENT DOCUMENTS

| | | | | |
|---|---|---|---|---|
| 6,127,783 | A * | 10/2000 | Pashley et al. | 315/149 |
| 6,445,139 | B1 * | 9/2002 | Marshall et al. | 315/291 |
| 2005/0248299 | A1 * | 11/2005 | Chemel et al. | 315/312 |

FOREIGN PATENT DOCUMENTS

| | | | |
|---|---|---|---|
| DE | 699 060 260 | T2 | 12/2003 |
| DE | 102004047669 | A1 | 4/2006 |
| DE | 601 12 612 | T2 | 6/2006 |

* cited by examiner

*Primary Examiner* — Evan Dzierzynski
(74) *Attorney, Agent, or Firm* — Scully, Scott, Murphy & Presser, P.C.

(57) ABSTRACT

In order to avoid firstly decidedly periodic loading of an output-buffered constant current power supply unit (17) and secondly physiological loading as a result of only intermittently appearing primary colors (R, G, B) when activating mixed light color loci, primary color light sources (11R, 11G, 11B) are energized in pulse-width-modulated fashion periodically in a temporally offset manner, but in addition in each instance, in time-parallel fashion with respect thereto, also those primary color light sources of further primary color light sources (11R, 11G, 11B) whose primary colors in the cyclic activation are not being energized at that time are likewise energized in a pulse-width-modulated manner (FIG. 2). If, in addition, white light light sources (11W) are intended to be used, they are expediently in each case energized simultaneously with one of the primary color light sources (11R, 11G, 11B) and the other two of these primary color light sources, on the other hand, are energized in a temporally offset manner simultaneously in pairs.

6 Claims, 2 Drawing Sheets

METHOD AND DEVICE FOR EMITTING MIXED LIGHT COLORS

BACKGROUND OF THE INVENTION

1. Field of the Invention

The invention relates to a method for periodically emitting mixed light colors from primary color light sources. Moreover, the invention is also directed to a device for implementing the inventive method.

2. Discussion of the Prior Art

Such measures are known from DE 10 2004 047 669 A1 (therein in particular in connection with FIG. 3*a* and FIG. 4*b*). According to this document, light sources of the three primary valences (primary colors) red, green and blue, periodically commencing simultaneously, are energized with duty factors which can be set independently of one another and their color emissions are additively mixed. Light sources such as lasers, electroluminescence elements, organic LEDs or in particular semiconductor light-emitting diodes are preferably used since their brightnesses are approximately linearly dependent on the duty factor of the feed with pulse-width-modulated constant current pulses. The resultant mixed light color locus can be represented in the CIE standard chromaticity diagram sketched therein (FIG. 6). This color locus can accordingly be displaced via at least one of the three primary-colored brightness contributions. Each mixed light color can therefore be set within a color triangle which is inscribed in the standard chromaticity diagram and whose corner points are given by the individual color emissions of the three primary-colored light sources used for the mixed light illumination.

Simultaneous switching on of the three light sources within each period can, however, represent a considerable and therefore impermissible pulse load on a system with isolated operation, such as in particular the on-board power supply system of an aircraft, whose passenger cabin is intended to be illuminated with color impressions which vary for example depending on the time of day. At the output of a constant current power supply unit fed from the on-board power supply system for the operation of the light sources, the available energy must therefore be buffer-stored by means of space-consuming and comparatively heavy and expensive stores, in particular electrolyte capacitors.

SUMMARY OF THE INVENTION

Therefore, the invention is first based on the technical problem of reducing the complexity in terms of circuitry and apparatus on the part of the power supply for the light sources whose intensity can be controlled via a constant current flow which can be pulse-width-modulated.

According to the invention, the cyclic pulse-width-modulated switching-on of the constant current pulses for the three primary colors no longer takes place in unison at the beginning of each activation period, but over the entire duration of the respective period successively in phase-offset fashion with respect to one another; and in particular in each case at the period beginning with a varying trailing edge, in the period centre with leading and trailing edges which can be varied synchronously in opposition and at the period end with a varying leading edge of the current pulses. This temporal distribution of the commencement of the activation of the three light sources and therefore the sequential distribution of the electrical total loading over the respective activation period avoids, in comparison with time-parallel activation, extreme pulse loading of the power supply unit buffering precisely at the beginning of each period and thereby reduces the demand for energy to be buffer-stored in the power supply unit.

The overall brightness of the resulting mixed color locus can be varied by changing the period length while maintaining the duty factors (ratio of the switch-on time of a current pulse to the period duration); while, via the individual duty factors themselves, it is possible to vary the intensity of the respective single-colored contribution of each of the three primary colors to the mixed light color impression and as a result to alter the color locus of the mixed light emission in a targeted manner.

However, such differently colored pulse illuminations which are temporally offset with respect to one another, in particular are successive without any mutual temporal overlaps in different lengths, can physiologically be perceived as disruptive. This is because they result in a color separation effect which is disruptive to the human eye, with the result that, especially on an object moving in front of a background, no stable color locus appears under certain circumstances. In addition, the periodic colored light emissions of different lengths can bring about irritating stroboscopic effects in particular on periodically moving objects which as a result are irradiated in intermittent fashion; and light floating phenomena if objects are irradiated with frequencies which differ slightly from one another, such as by light sources fed from unsynchronized systems, for example.

With the knowledge of these particular conditions, the invention is based on the additional technical problem of improving the physiological acceptance of multicolored mixed light illumination with mixed colors which can be set via light source energization which can be pulse-width-modulated.

In accordance with a preferred development of the invention, the primary colors used for the color mixing (the color locus) are therefore switched on with their presently predetermined duty factors now not only within the respective activation period successively in temporally offset fashion with respect to one another but also with their just individually predetermined duty factors in each case all simultaneously. This means that the (two or preferably three) primary colors which are available for color mixing always radiate in pulse-width-modulated fashion simultaneously and in the process within one period in phase-offset alternating fashion. The color locus apparent to the eye from the periodic superimposition of the primary color contributions is therefore activated both temporally sequentially and simultaneously also in time-parallel fashion by virtue of the fact that the primary colors which are not activated at that time in the periodic sequence are emitted via additionally provided light sources with their duty factors which at that time are identical or with duty factors which are individually matched for color correction purposes. In terms of activation, this can be illustrated as a 3×3 RGB matrix, in which each of the three primary colors only occurs once per column and per row. Since the mixed color illumination thereby takes place in each period three times successively by different light sources, this results for the integral perception of the human eye per se in the threefold emission brightness; for this reason the energization of the light sources for the same mixed color and brightness impression now only needs to take place with a correspondingly reduced constant current intensity, which reduces the electrical losses and the thermal loads in the illumination system noticeably.

However, the illumination does not need to be restricted to mixed light of only the three primary colors corresponding to the abovementioned 3×3 matrix; the matrix is in principle of any desired size. In practice it may be of interest to intensify the yellow range of the spectrum resulting between red and green, for example in order to bring the illumination closer to specific light impressions corresponding to daytime, namely by means of additional yellow-emitting LEDs. On the opposite side of the color triangle, the spectrum can be filled with LEDs whose emission is between green and blue in order to promote more night time moods. In particular, for example for brightening the respective color locus, it is expedient to also use a light source for a contribution of white light (preferably from a light source which is blue per se, but which emits white light as a result of a phosphor coating).

In order to reduce the wiring complexity, it is then expedient not to give each light source a dedicated position in the matrix, but, for example, to always combine two light sources. Instead, therefore, of activating for example a matrix comprising 4×4 light sources on a column and row basis, a 2×2 matrix comprising in each case two light sources is operated.

BRIEF DESCRIPTION OF THE DRAWINGS

Additional developments of the solution according to the invention are elucidated in the detailed description relating to preferred implementation examples of the invention which are illustrated in the drawing in a manner abstracted to what is functionally essential, in which drawing.

DETAILED DESCRIPTION OF THE INVENTION

Figure 1:
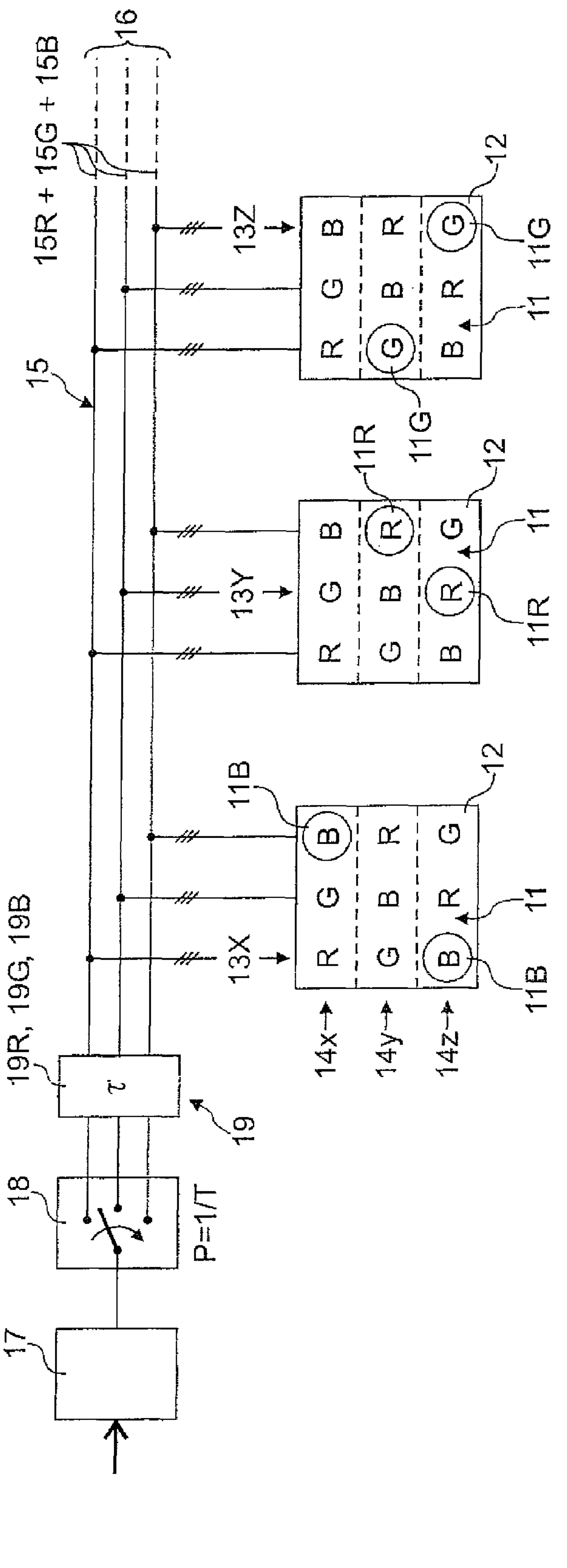
FIG. 1 shows the activation of matrices comprising in each case 3×3 light sources for the three primary colors.

For the use of three light sources 11 (11R, 11G, 11B) for the additive generation of mixed light from the three primary colors R (red), G (green) and B (blue), such light sources 11 as shown in FIG. 1 for the electrical activation are grouped in terms of circuitry into matrices 12 comprising columns 13 and rows 14. However, this does not mean that the individual light sources 11 (preferably LEDs) actually need to be installed in this square configuration—in apparatus-related practice, they are instead usually combined to form triplets of in each case three individual primary color light sources 11 which are to be activated correspondingly in phase-offset fashion at the locus to be irradiated at that time.

For their operation, each of the light sources 11 is connected in single-pole or two-pole fashion via an associated one of the strands 15 of a multi-conductor cable 16 to a power supply unit 17. Downstream of the power supply unit there is, as shown in FIG. 1, a changeover switch 18, via which the columns 13 of each matrix 12 with their light sources 11 are energized in periodic sequence. Pulse-width modulators 19 (19R, 19G, 19B), when each column 13 is energized, individually determine the switch-on times (duty factors “tau”) of their differently colored light sources 11 (11R, 11G, 11B).

Figure 2:
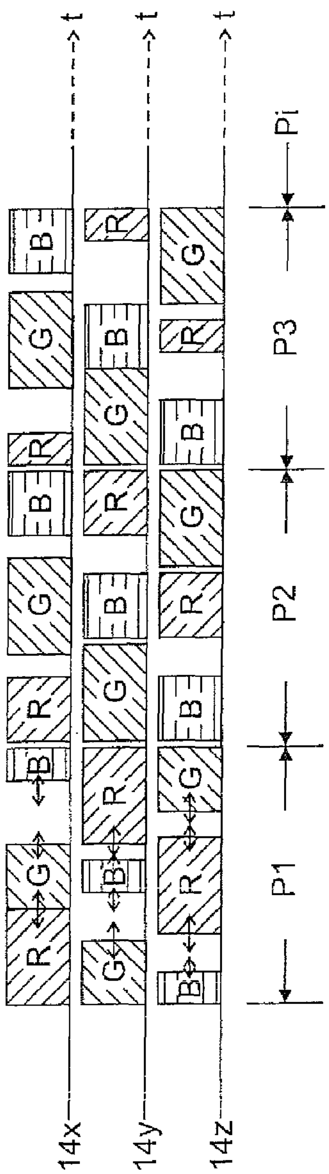
FIG. 2 shows the pulse-width-controlled energization thereof while displacing the color locus in timing diagrams.

Each color of the light sources 11R, 116, 11B occurs only once in each column 13 (13X, 13Y, 13Z) and in each row 14 (14$x$, 14$y$, 14$z$) of each matrix 12, namely as sketched in the same relative but mutually phase-offset sequence. In the case of each of the matrices 12, the light sources 11 in the sequential columns 13 are energized cyclically and successively. In this way, as illustrated in FIG. 2 over time t, although the primary color light sources 11R-11G-11B in one row 14 are switched on sequentially in time in pulse-width-controlled fashion, in each case at the same time, i.e. parallel to this, the respective other two of the three primary colors R, G, B in the just energized column 13 are also activated with their present duty factors; but they may have, in contrast to the basic illustration in FIG. 2, different duty factors for identical primary colors as well. In any case this means that not always only one of the primary colors radiates successively, to a certain extent on a row basis (14), but all three primary colors are always superimposed on one another with the intensities in accordance with their instantaneous duty factors, to a certain extent on a column basis (13), and therefore mix with one another for the impression of the human eye. Therefore, although mixed light R-G-B is always emitted in temporally overlapping fashion, the commencement of the emissions of all of the primary colors R, G, B is distributed over the entire period P and thereby singular pulse loading of the power supply unit 17 within the respective period P is avoided.

As is illustrated in the timing diagram in FIG. 2, in each period P, in the case of the first primary color switched on, the position of the trailing edge and, in the case of the third primary color, the position of the leading edge is modulated temporally for predetermining the duty factor; while the second color occurring in between is preferably modulated symmetrically with respect to the period centre as indicated in the period P1 of FIG. 2 by the small horizontal double arrows. Although this means that high duty factors can result in temporal overlaps of two of the three color activations, optimum distribution of the energy requirement over the respective period P is nevertheless maintained.

In the optional example shown in FIG. 2, in a period P1 a color locus is mixed from a strong red component R, a medium-intensity green component G and a weak blue component B. The three primary light sources 11R, 116 and 11B are switched on successively for a corresponding length of time for this purpose (row 14$x$). At the same time, in accordance with the two other rows 14$y$ and 14$z$, in each case the two other primary colors are connected via their duty factors. This color mixing thus occurs three times successively in the period P1, namely in the interest of energy distribution whilst switching over between the light sources 11 (FIG. 1).

In the following periods P2, P3, . . . Pi, in this implementation example the color locus is then displaced in two steps (periods P2=>P3) beyond the white light (the achromatic locus in the color triangle) towards the green by virtue of the blue and primarily green components B and G being intensified as a result of extended duty factors; whereas the red component R is reduced stepwise.

For the color locus in which (not shown) the contributions of all three primary colors R, G, B correspond to one another in each of the sequential periods Pi of a constant length, i.e. are emitted with the same duty factors, the physiologically questionable color separation effect mentioned at the outset is eliminated completely. There is then only the weak (since it occurs subjectively much less often), monochromatic stroboscopic effect of a light/dark pattern.

In the case of other color loci (for example as shown in FIG. 2), the color separation effects are only eliminated partially because the primary colors are mixed in different intensities (duty factors). The color impressions remaining in the case of the multiple (since it is both temporally offset and temporally overlapping) mixed light emission in accordance with the present invention, for example as shown in FIG. 2, have a less disruptive effect, however, because, as a result of their higher frequencies, they are now only present for a shorter period of time.

Figure 3:
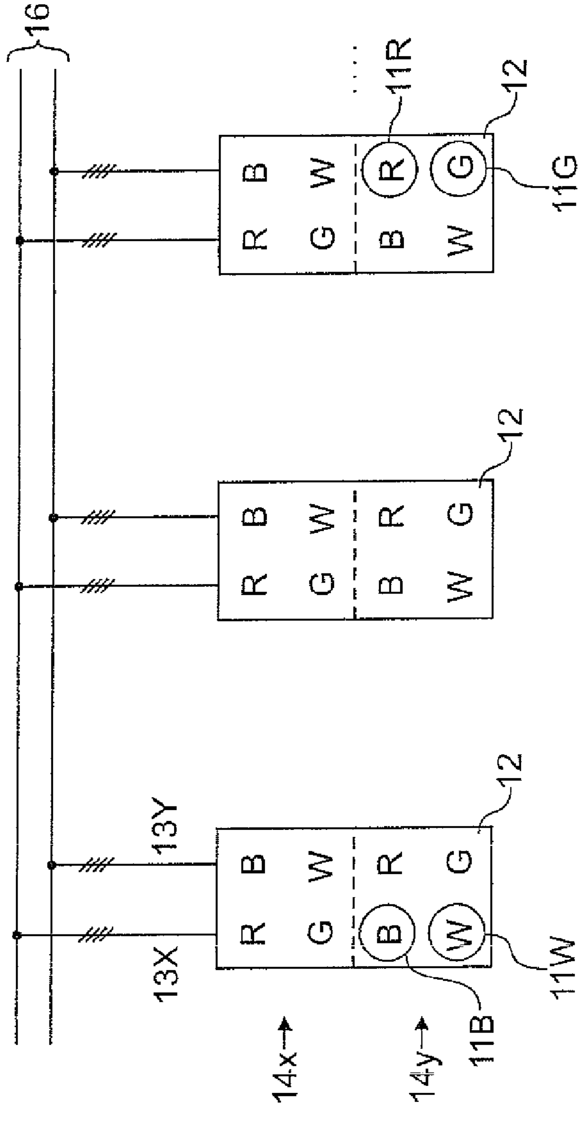
FIG. 3 shows the activation of matrices comprising 2×2 double light sources, namely for firstly two primary colors and secondly the third primary color and white light emission.
Figure 4:
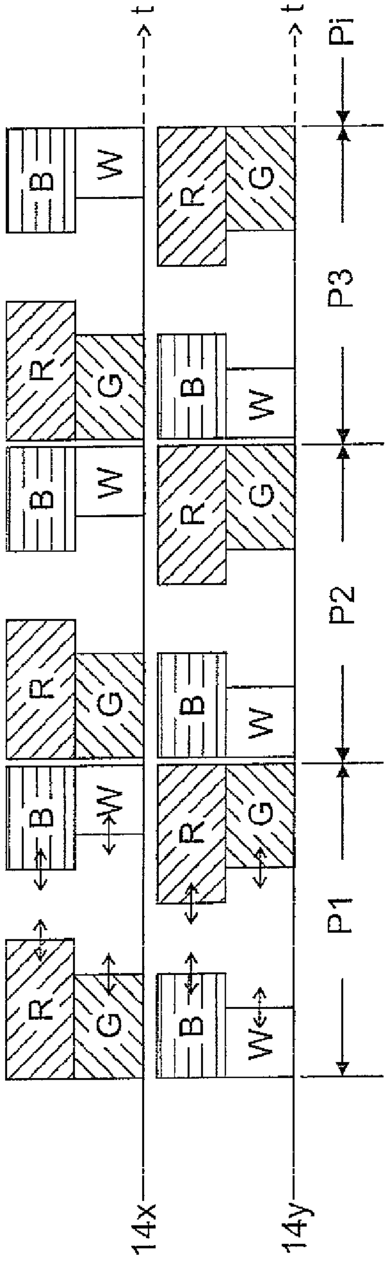
FIG. 4 shows the pulse-width-controlled energization thereof while maintaining the color locus in timing diagrams.

In the case of the matrices 12 shown in FIG. 3, another light source 11 for white emission W is added to the primary colors R, G and B. This would result, as shown in FIG. 1, per se in the individual activation of the elements (light sources 11) in 4×4 matrices. For reasons of complexity, however, the four contributions shown in FIG. 3 are combined to form a 2×2 matrix 12 by virtue of the fact that two different light sources 11 are activated simultaneously at each position in the matrix. This reduces the control complexity since switch-on operations in the period centres, i.e. with their symmetrical modulations of leading and trailing edges (cf. FIG. 2 vs. FIG. 4) can be dispensed with.

Still more noticeably, the wiring complexity is reduced if the two simultaneously operated light sources 11 (in contrast to FIG. 4) can also have respectively corresponding duty factors and can therefore be operated directly in a parallel circuit, which however results in a restriction of the color loci which can be achieved thereby, but this restriction is often still bearable in practice.

It is critical that, even in this constellation again (FIG. 4), the color components occurring successively in each period P are in addition also activated simultaneously in this period P in the case of other light sources. Since this again multiplies the brightness of the resultant mixed light illumination, as in the case of the example shown in FIG. 1/FIG. 2, the operation of the light sources 11 can again in principle advantageously take place with a reduced constant current intensity.

In order therefore to avoid firstly decidedly periodic loading of an output-buffered constant current power supply unit 17 and secondly physiological loading owing to only intermittently appearing primary colors R, G, B when activating mixed light color loci, according to the invention additional primary color light sources 11R, 11G, 11B are energized likewise in pulse-width-modulated fashion, possibly individually, in periodically temporally offset fashion. If additional light sources beyond the primary colors, such as, for example, white light light sources 11W, are intended to be used, they are, however, expediently in each case activated in pairs simultaneously with one of the primary color light sources 11R, 11G, 11B and the other two of these primary color light sources, on the other hand, are activated in temporally offset fashion for their part simultaneously in pairs; cf. FIG. 4.

LIST OF REFERENCE SYMBOLS

11 Light sources (for R, G, B and possibly W)
12 Matrix (with 11R+11G+11B and possibly 11W) comprising 13 and 14
13 Columns of 12
14 Rows of 12
15 Strands of 16
16 Multi-conductor cable comprising 15
17 Buffered power supply unit
18 Changeover switch as a symbol for the periodic activation
19 Pulse width modulator (for duty factors "tau" of R, G, B and possibly W)

What is claimed is:

1. Method for periodically emitting light of a predefined mixed color locus, comprising:

mixing light constituted of at least two primary colors by energizing at least two different respective primary color light sources;

said light sources being energized in a cyclic pulse-width modulated mode; and implementing said cyclic pulse-width within a cycle period in which said at least two different primary light sources are energized temporally offset relative to each other;

wherein the light sources for initially two said primary colors and thereafter for the third of the primary colors and for a further light color, such as white light, are, in each instance, energized in pairs, both periodically in a temporally alternating mode and in a temporally overlapping mode;

a cyclic pulse-width-modulated switching-on of the constant current pulses for the primary colors being implemented over the entire duration of the respective period successively in a phase-offset mode with respect to one another; and in each case at the period beginning with varying trailing edge, in the period centre with leading and trailing edges which are variable synchronously in opposition and at the period end with a varying leading edge of the current pulses;

and wherein the overall brightness of a resulting mixed color locus is variable by changing the period length while maintaining a ratio of the switch-on time of a current pulse to the period duration.

2. Method according to claim 1, wherein the light sources are selectively energized at the beginning or at the end of each cycle period with, respectively, a variable trailing edge and a variable leading edge.

3. Method according to claim 2, wherein an additional light source is energized at the center of the cycle period, and with the variable leading and/or trailing edges being energized symmetrically with respect to the center of the cycle period.

4. Method according to claim 1, wherein at least one further light source for a third primary color or for additional light emission, selectively consisting of a white or yellow light, is in each instance energized in a temporally overlapping mode with respect to the light sources which are energized periodically in said temporally offset mode.

5. Method according to claim 4, wherein said light sources for the three primary colors are energized both successively and simultaneously in periodic alternations.

6. Method according to claim 1, wherein the energizing of said light sources is implemented at a corresponding reduction in an input level of a constant current intensity for attaining a required mixed color and brightness impression.

* * * * *

UNITED STATES PATENT AND TRADEMARK OFFICE

CERTIFICATE OF CORRECTION

PATENT NO. : 7,952,784 B2
APPLICATION NO. : 12/205172
DATED : May 31, 2011
INVENTOR(S) : Eckhard Steffen et al.

It is certified that error appears in the above-identified patent and that said Letters Patent is hereby corrected as shown below:

Title Page, Item (73) Assignee, should read:

-- Diehl Aerospace GmbH, Überlingen (DE) --

Signed and Sealed this
Twenty-third Day of August, 2011

David J. Kappos

David J. Kappos
*Director of the United States Patent and Trademark Office*